March 19, 1929.  W. L. HANLEY, JR  1,705,475
TUNNEL KILN
Original Filed Aug. 30, 1926   3 Sheets-Sheet 1
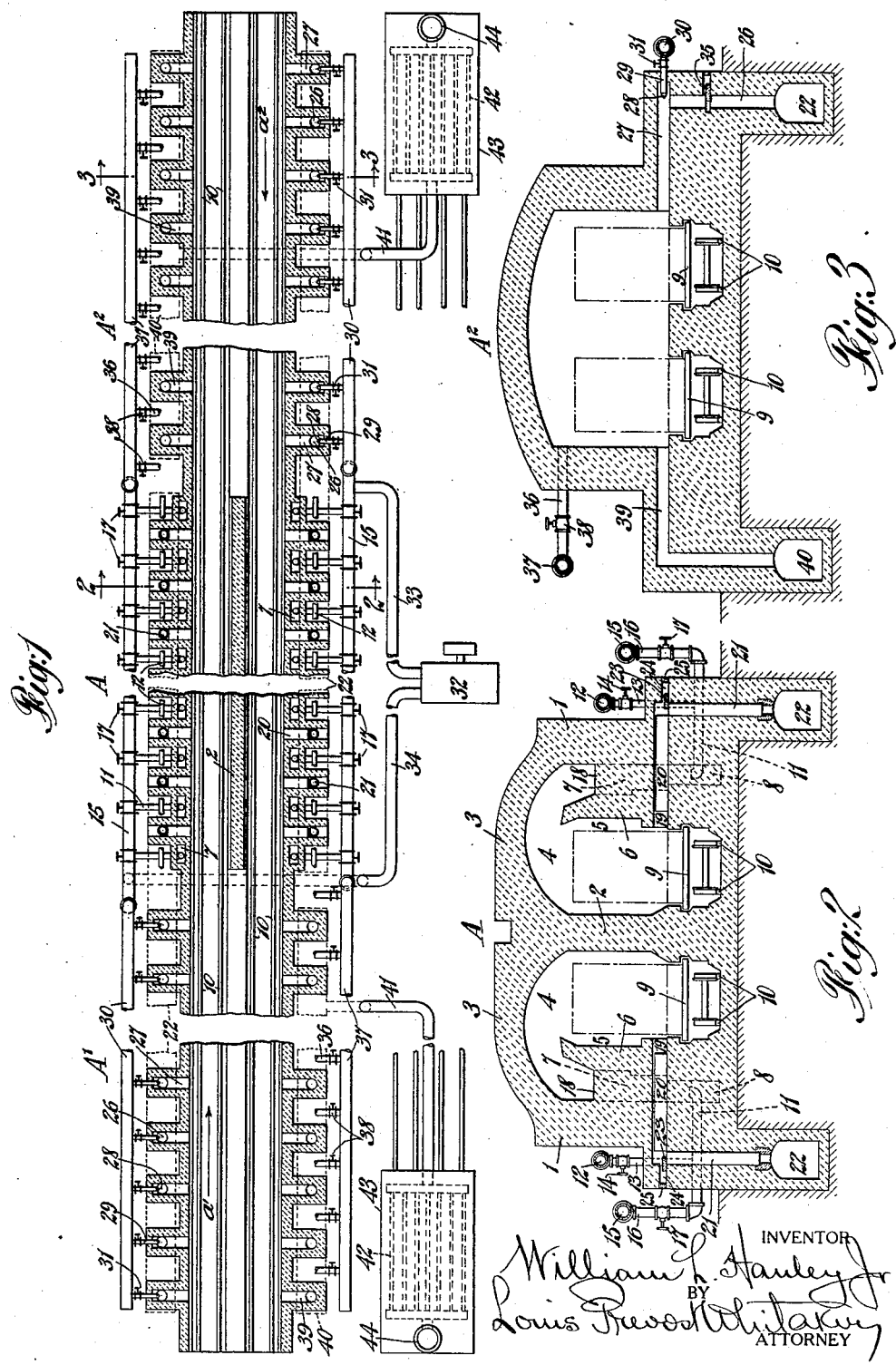

March 19, 1929. W. L. HANLEY, JR 1,705,475
TUNNEL KILN.
Original Filed Aug. 30, 1926  3 Sheets-Sheet 2
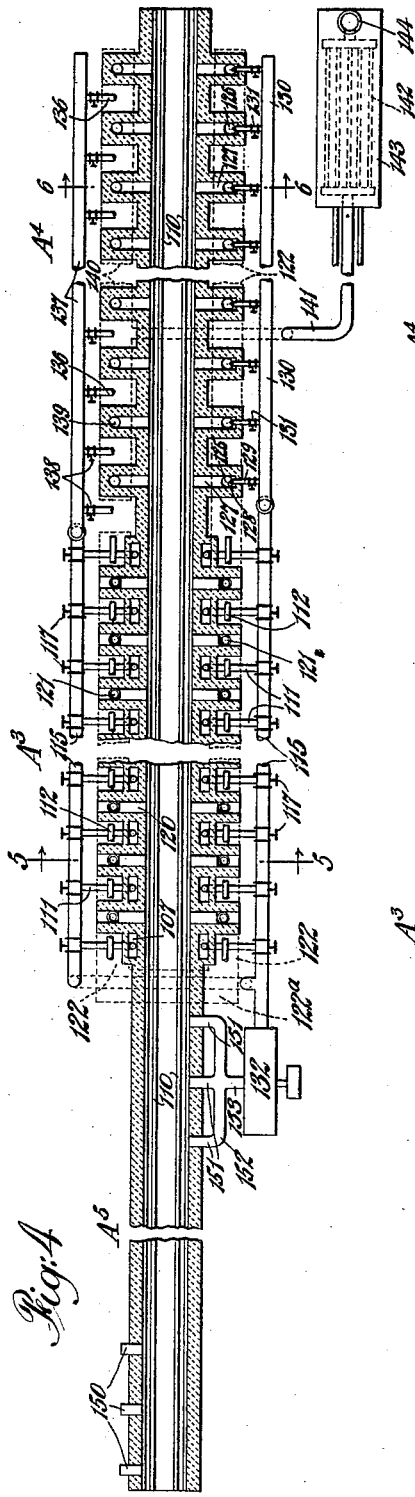

March 19, 1929.  W. L. HANLEY, JR  1,705,475
TUNNEL KILN
Original Filed Aug. 30, 1926   3 Sheets-Sheet 3
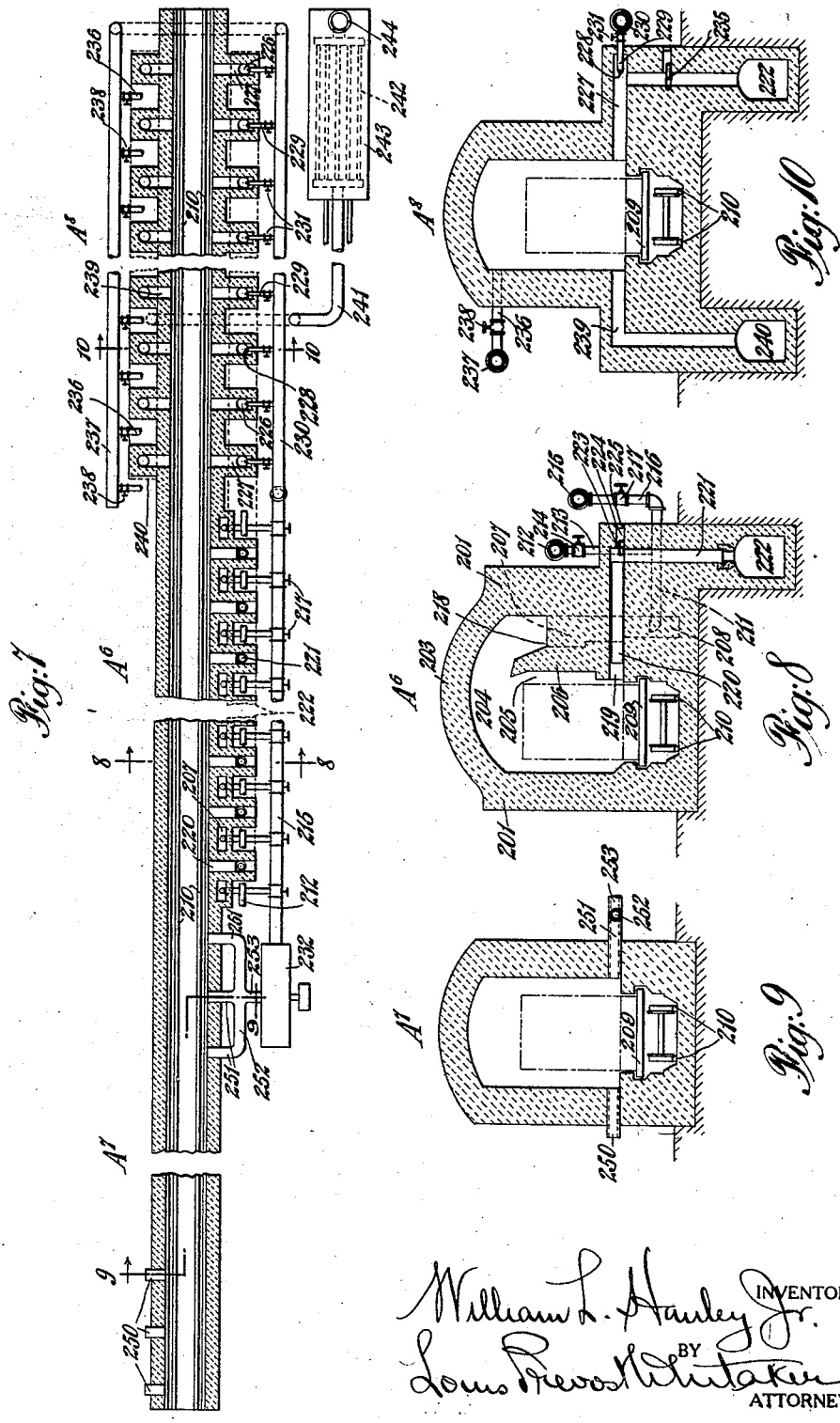

Patented Mar. 19, 1929.

1,705,475

UNITED STATES PATENT OFFICE.

WILLIAM LEE HANLEY, JR., OF BRADFORD, PENNSYLVANIA.

TUNNEL KILN.

Application filed August 30, 1926, Serial No. 132,392. Renewed August 8, 1928.

My invention consists in the novel features hereinafter described, reference being had to the accompanying drawings which illustrate several embodiments of the invention selected by me for purposes of illustration, and the said invention is fully disclosed in the following description and claims.

The object of my invention is to produce a tunnel kiln especially adapted for the firing of bricks and other coarse clay and ceramic products. In the construction of such kilns, a simple and economic structure is particularly desirable in order to minimize the initial cost of the kiln, and the expenses of upkeep and repair, and it is also of great importance to obtain the highest efficiency of the heating means employed for firing the kiln, and to utilize the heat thereof to the greatest possible advantage, in order to keep down the expenses of operation. One of the important features of my present invention is, that I heat the firing zone or zones of the kiln by furnaces which discharge their products of combustion directly into the goods space thereof, and the hot products of combustion, after imparting their greatest heat to the ware within the firing zone or zones, are withdrawn therefrom and conducted to and discharged into a preheating zone or zones, so that the heat of such products of combustion remaining therein, may be utilized in preheating the unfired ware on its way to the firing zone, and gradually effect the preheating, oxidation, and water-smoking of the unfired ware and bring it up to a temperature approximately that of the entering end of the contiguous firing zone, the fresh air to provide the necessary oxygen to effect the oxidation of the ware and prevent scumming or staining it, being introduced into the preheating zone or zones with the hot products of combustion, or separately therefrom, or both.

My invention also contemplates the employment in conjunction with the means for conveying the hot products of combustion to a preheating zone of air injecting means, for supplying oxygen to the preheating zone and simultaneously creating the necessary suction in the eduction passages for withdrawing the hot products of combustion from the firing zone, to effect such withdrawal.

My invention also contemplates the employment of a single air forcing apparatus for supplying air to said injecting nozzles, and also to the furnaces or burners employed in heating the firing zone, and for any auxiliary air inlet passages connected with the preheating zone, thus avoiding the duplication of air forcing devices which is customary in connection with tunnel kilns.

My invention is applicable to twin tunnel kilns provided with parallel goods conveying means movable in opposite directions therethrough, in which case the hot fired ware after passing from one of the firing zones, will in cooling give up heat for preheating, water-smoking, and oxidizing the incoming unfired ware in each of the end portions of the kiln, in addition to the means previously referred to.

My invention is also applicable to single tunnel kilns, in which the preheating, oxidation, and water-smoking of the unfired ware may be accomplished entirely by means of the hot products of combustion, withdrawn from the firing zone in the manner previously described, and admitted with air into the preheating zone, or in addition thereto, the heat of the fired ware passing through the cooling zone after leaving the firing zone, may be utilized for heating the unfired ware if desired, as by admitting air to the cooling zone to be heated by contact with the cooling fired ware, and withdrawing such heated air and delivering it to the preheating zone, as by passing it through air forcing devices supplying air to the injector nozzles thereof, or by delivering it to the preheating zone by separate means.

My invention also contemplates means for withdrawing the air, and products of combustion from the preheating zone, either in the case of a twin tunnel or single tunnel kiln, together with the vapors and gases evolved during the preheating, oxidation, and water-smoking of the ware therein, and conveying such gaseous products away from the kiln to facilitate the operations of preheating, oxidation, and water-smoking, and the residual heat of such gaseous products may be thereafter utilized in large part, as by passing them through a drier or driers for the ware, in order to prepare it for firing in the kiln or for other heating purposes, so that practically all the available heat of the products of combustion may be utilized, and great economy of operation effected.

In the accompanying drawings,

Fig. 1, is a horizontal sectional view partly broken away, showing a twin tunnel kiln having my invention embodied therein.

Fig. 2, is a transverse vertical sectional view through the firing chamber and firing zones.

Fig. 3, is a transverse vertical section through one of the end portions of the kiln, constituting a combined preheating and cooling zone.

Fig. 4, is a horizontal sectional view of a single tunnel kiln embodying my present invention, and provided with a single firing zone having a longitudinal row of furnaces on opposite sides thereof.

Fig. 5, represents a transverse vertical section through the firing zone on the line, 5, 5, of Fig. 4.

Fig. 6, represents a similar section through the preheating zone on the line, 6, 6, of Fig. 4.

Fig. 7, is a horizontal sectional view similar to Fig. 4, showing my invention applied to a single tunnel kiln, having only the one row of furnaces.

Fig. 8, represents a vertical transverse sectional view through the firing zone on the line, 8, 8, of Fig. 7.

Fig. 9, represents a similar sectional view through the cooling zone on the line, 9, 9, of Fig. 7.

Fig. 10, represents a similar sectional view through the preheating zone on the line, 10, 10, of Fig. 7.

Referring to Figs. 1, 2, and 3, which illustrate a twin tunnel kiln embodying my invention, the kiln comprises a centrally located firing chamber, A, comprising two firing zones separated by a central, longitudinal, vertical, impervious partition wall, and end sections, A¹, A², extending longitudinally from the opposite ends of the firing chamber and being preferably of unitary or single tunnel structure without partitions, and being each a combined preheating and cooling zone, the kiln being provided with two sets of goods conveying means extending entirely through the kiln, parallel to each other, and each passing through both of the end sections and one of the firing zones. As goods conveying means, I preferably employ parallel tracks, upon each of which runs a line of tunnel cars, extending from one end of the kiln to the other in a well known way, the said cars being moved on one track in one direction, and upon the other track in the opposite direction.

The firing chamber comprises the lateral walls, 1, the longitudinal partition wall, 2, and the roof portion which comprises preferably two separate crowns, 3, 3, forming a double tunnel structure and enclosing two firing zones, indicated at 4, 4. Each of the firing zones, 4, is provided with a longitudinally extending bridge wall, 6, on the outer side of the goods space indicated at 5, and separated from the outer wall, 1, so as to form a passage, 7, indicated in dotted lines in Fig. 2, for the passage of the products of combustion from the furnaces, 8, over the top of the bridge wall and into the goods space of the firing zone. The bridge walls are preferably provided at their upper edges with inwardly extending portions, to assist in deflecting the products of combustion from the furnaces over upon the goods supported on the tunnel cars, indicated at 9, on the tracks 10, and in conjunction with the curved crown or roof, 3, to project them downwardly upon and through and around the ware.

The furnaces may be of any usual or desired character, according to the kind of fuel employed, and are preferably arranged in rows adjacent to the outer side of each firing zone, and are provided with means for independently controlling them. In the present instance, I have shown the furnaces, 8, provided with gas burners, indicated at 11, supplied with gas from a supply pipe, 12, by suitable pipes, 13, provided with controlling valves, 14, and air from an air pipe, 15, by means of suitable pipes, 16, provided with independent controlling valves, 17. By this means, the several furnaces in each row may be independently regulated, so as to produce the desired temperature within the contiguous portion of the firing zone, into which its products of combustion are discharged. The furnaces of each firing zone will be so regulated, as to provide a gradual rise of temperature from the entering end to the discharge end of each firing zone, which may be indicated by what is termed a heat curve. It will be understood that the heat curve of one firing zone will be the opposite of that in the other firing zone, which is made possible by the centrally located, impervious, longitudinal partition wall, 2. Where other forms of fuel than gas are employed, the particular regulating means will be necessarily modified in accordance with the character of the fuel, to accomplish the same purpose. I prefer to provide each firing zone between adjacent furnaces with transverse partitions indicated at 18, 18, extending from the bridge wall to the outer wall of the furnaces, said transverse partitions being preferably of less height than the bridge wall, so that the discharge passages, 7, from the furnaces, 8, unite above said partitions, 18, and thus deliver a sheet of flame, and products of combustion extending the entire length of the firing zone, over the bridge wall and upon the ware in the goods space of said zone, the temperature of which at different points longitudinally of the zone, will vary in accordance with the heat curve. Each of the firing zones is provided with means for withdrawing the products of combustion therefrom, after they have imparted their greatest heat to the ware, in order to prevent them from passing into the end portions of the tunnel, and to enable their residual heat to be further employed in effecting the preheating, oxidation, and water-smoking of the unfired ware.

In this instance I have shown the inner face of the bridge wall of each firing zone provided adjacent to the lower portion of the goods space therein, with a plurality of eduction ports, 19, arranged at different points longitudinally of the firing zone and connected with suitable eduction passages, for connecting them with a common collecting flue, the said flue and connecting passages being under rarification or suction, so as to positively withdraw the products of combustion from the adjacent firing zone. In this instance I have shown the eduction ports, 19, arranged in alignment with the transverse partitions, 18, and the eduction passages comprising a horizontal passage, 20, connected with a vertical passage, 21, leading to the collecting flue, 22, which is preferably located outside of the kiln and conveniently below the ground level. These eduction passages may be independently controlled as by means of a sliding damper indicated at 23, accessible through a passage, 24, having a removable closure, 25, which gives access to the damper, and also permits the lower portion of the ware within the firing zone to be actually viewed at a number of different points corresponding with the locations of the eduction ports, 19, longitudinally of the firing zone. It will be understood that in a twin tunnel kiln, there will be two sets of eduction passages and two of the collecting flues, 22. According to my invention, the hot gases from each row of furnaces are conducted by the collecting flue, 22, to and delivered to one of the end portions of the tunnel, $A^1$, or $A^2$, and are introduced at separated points longitudinally of the end section and on the side thereof, adjacent to the cars of unfired ware on its way to the firing zone. As illustrated in Fig 3 for example, which represents a section through one of the end portions of the kiln shown in Fig. 1, each flue, 22, is provided with a plurality of heat distributing pipes or passages indicated at 26, and 27, being in this instance vertical passages, 26, communicating with horizontal passages, 27, discharging into the end section of the kiln adjacent to the lower portion of the goods space therein, and adjacent to the ware which is to be preheated.

In order to secure the proper amount of oxygen to insure the proper oxidation of the ware and to prevent scumming, I arrange to admit with the products of combustion from the firing zone, a considerable quantity of fresh atmospheric air which may, or may not be preheated. I prefer to introduce this air directly into the heat distributing pipes or passages, in such manner as to create a current or suction in the eduction flue, 22, and connected eduction passages, and for this purpose I conveniently provide the heat distributing pipes or passages with ejector nozzles indicated at 28, each connected by a pipe, 29, with an air supply pipe, 30, each of the nozzles, 28, being controlled by an independent valve, 31.

I prefer to provide a single air forcing device capable of supplying all of the atmospheric air required in connection with the kiln, to avoid multiplication of air forcing devices, and in this instance for example, I have shown a single fan or blower, 32, which is connected for example by a pipe, 33, with an air supply pipe, 15, of the adjacent furnaces, and also to the air supply pipe, 30, for the injector nozzles, 28, on the same side of the kiln, said air forcing device being also connected by a pipe, 34, for example, with the air supply pipe, 15, for the row of furnaces on the opposite side of the kiln, and to the air supply pipe, 30, for the injector nozzles on that side of the kiln. It will be seen that the discharge of jets of air through the nozzles, 28, will create a suction in the adjacent collecting flue, 22, and the eduction passages connected therewith, which will insure the withdrawal of said gases from the adjacent firing zone, and their delivery to the end section of the kiln adjacent to the unfired ware therein. The valves, 31, controlling the nozzles, 28, may be independently regulated, so as to regulate the quantity of air admitted at different points along the length of the end section of the kiln, together with the quantity of products of combustion admitted at such points, and secure the gradual heating of the unfired ware. If it is desired, the heat distributing passages, 26, 27, may be provided with additional dampers as indicated at 35 in Fig. 3, for example.

It will be understood, that the unfired ware in each of the end sections of the kiln will also be heated by radiation and convection from the fired ware on the other row of cars in each of said end sections. I may also provide for the admisison of further quantities of atmospheric air into each end section if desired, at either one or both sides thereof, if it is necessary to admit additional quantities of air at some or all portions longitudinally of the said end sections to insure the proper oxidation of the ware, and prevent scumming or discoloration of the same. In this instance, I have shown for example, a row of air inlets, 36, throughout each of the end sections as illustrated in Fig. 3, for example, connected with an air pipe, 37, which may receive its air from the fan, 32, by connecting it with one of the adjacent air pipes, 15, for example, or otherwise, each of the air inlets, 36, being provided with a suitable controlling valve or damper, 38. These inlets, 36, are preferably located adjacent to the fired ware, so that the air admitted therethrough may be heated by contact with the fired ware before coming into contact with the unfired ware.

I prefer also to provide each of the end sections, $A^1$ or $A^2$, of the kiln, with a plurality of eduction passages indicated at 39, connected with a common eduction flue, 40, said eduction passages, 39, being arranged at different points longitudinally of the said end section, for withdrawing therefrom the products of combustion admitted through the passages, 26 and 27, together with the vapors, gases, and other gaseous material after it has performed its function of preheating, oxidizing, and water-smoking the unfired ware, so that the latter is continuously acted upon by the incoming products of combustion and air, while the "water-smoke" etc., is being continuously withdrawn with the products of combustion. These products withdrawn from the end sections of the kiln still contain a considerable amount of heat, and they may therefore be conducted to a suitable point where this residual heat may be utilized. For example, they may be conveniently conveyed by a pipe, 41, to heating tubes or pipes, 42, arranged in a drier, 43, in which the ware is dried, preparatory to passing it into the kiln. In this instance, I have shown the heating pipes, 42, for the kiln, connected with a stack, 44, or other air exhausting means, by means of which a current is induced in the eduction pipes, 39, eduction flue, 40, connecting pipe, 41, and heating pipes, 42, to withdraw the products from each end section of the kiln, and conduct them to the heating pipes of an adjacent drier.

It will be understood, that, in the case of a twin tunnel kiln the construction and operation of the end sections $A^1$ and $A^2$, each of which constitutes a combined cooling and preheating zone, will be identical, the relative positions of the inlet pipes and eduction pipes being simply reversed, as clearly shown in Fig. 1.

It will be understood, that, cars loaded with unfired products will be introduced into the end section $A^1$, at the point indicated at $a^1$, and into the end section indicated at $A^2$, at the point indicated at $a^2$, and will be moved gradually on one of the lines of tracks through each end section where the ware is gradually heated by the cooling ware on the other track therein, and also by the hot products of combustion injected into each end section in conjunction with fresh air from the nozzles, 28, supplying additional heat to the unfired ware, and also fresh air containing the necessary oxygen to properly oxidize it, these nozzles preferably providing the suction for withdrawing the products of combustion from the firing zone. By properly regulating the nozzles, 28, and controlling dampers, 35, the preheating of the ware can be very carefully and accurately regulated from the time it enters the kiln until it reaches the firing zone through which it is to pass, so as to properly preheat and water-smoke the brick without cracking, scumming or otherwise injuriously affecting it, and the requisite amount of oxygen can be furnished throughout the travel of the unfired ware, to effect the thorough oxidation of the unfired ware. It will frequently be found that in certain clays the sulphur, for example, can be eliminated to the best advantage between certain temperatures, as the unfired ware is gradually raised in temperature in its progress toward the firing zone, and larger quantities of air can be admitted through the nozzles, 28, adjacent to the ware, within the portions of the end sections where such range of temperatures prevail, to insure the proper oxidation of the sulphur and its elimination from the fired goods. Different clays obviously require different conditions for efficient preheating, and my improved kiln provides for an extremely accurate control of the conditions within the preheating zone throughout the entire length thereof, and the proper admission of air to supply the necessary oxygen. Additional quantities of air can also be admitted, when desired, through any of the air inlet pipes or passages, 36, if required, and a very satisfactory transverse circulation will take place throughout each of the end sections of the kiln, which will assist in preheating, water-smoking, and oxidizing of the unfired ware.

It will also be understood, that, the products of combustion and air admitted through each end section, will become mixed with the vapors and gases from the unfired ware, and will be continuously withdrawn from each end section through the eduction pipes or passages, 39, and the eduction flue, 40, thus further contributing to the rapid and thorough preheating, water-smoking, and oxidation of the unfired ware, and these spent gases, air, and vapors which will still be in a highly heated condition, are conveniently conducted through the driers out of contact with the air therein, for the purpose of drying the air before it is introduced into the kiln.

My invention also provides for the firing of the ware on each row of cars in a separate firing zone wherein the desired heat curve can be maintained, so that the ware on each line of cars will be raised to a temperature substantially equal to that of the entering end of the firing zone through which it is to be passed, during its travel through the appropriate end section $A^1$, or $A^2$, as the case may be, and will then be subjected to gradually increasing temperatures in accordance with the heat curve maintained in the aligned firing zone, as it passes through the latter, the fired goods from each firing zone passing through the end section at the opposite end of the kiln from the one at which it entered, and gradually giving off its heat in cooling, to preheat the unfired goods on the other track therein, as before described.

In Figs. 4, 5, and 6, I have shown a single tunnel kiln embodying my invention and comprising among its members a firing zone heated by means of a row of furnaces or burners located on each side thereof. In these figures, the firing zone is indicated at $A^3$, as located centrally of the length of the kiln and provided with the end sections, $A^4$, and $A^5$, of which the end section $A^4$, is the preheating zone, and the end section, $A^5$, is the cooling zone, the kiln being constructed as a single tunnel throughout its length. The various parts hereinbefore described, and which are found in these Figs. 4 to 6 inclusive, are given the same reference numerals with 100 added. The firing zone comprises the side walls, 101, and crown, 103, and is provided interiorly with two bridge walls, 106, parallel to the side walls and connected therewith by the transverse partitions, 118. The two rows of furnaces or burners are indicated at 108, provided in this instance with burners, 111, supplied with gas by the pipes, 113, provided with regulating valves, 114, and connected to the supply pipes, 112, the burners being also supplied with air by pipes, 116, controlled by valves, 117, said pipes, 116, being connected with the air supply pipes, 115, so that the desired heat curve can be maintained in the firing zone. The products of combustion from each furnace or burner will pass upward between the partitions, 118, and be discharged downwardly upon the goods in the goods space between the bridge walls in the manner previously described, and will be withdrawn at each side of the firing zone through the eduction ports, 119, and eduction passages, 120 and 121, under the control of the regulating means or dampers, 123, passing into the collecting flues, 122.

In this instance, as there is only one preheating zone, the collecting flues, 122, are conveniently connected by a cross flue, $122^a$, and one of said collecting flues, 122, is extended along one side of the preheating zone as indicated in dotted lines in Fig. 4, where it communicates with the heat distributing pipes, 126 and 127, as clearly shown in Fig. 6, the said pipes being provided with the air injecting nozzles, 128, controlled by valves 131, and connected with the air supply pipe, 130, in the same manner as previously described with reference to the previous figures, these nozzles serving to create the necessary suction in the collecting flues, 122. In this instance, the hot products of combustion discharged into the preheating zone may provide the only means for preheating the unfired ware, and each of the heat distributing passages is preferably provided with regulating means, as the dampers, 135, for example, so that the heat can be regulated throughout the entire length of the preheating zone, while the quantity of air admitted at different points throughout the length of the preheating zone can be regulated by air inlet valves, 131. The preheating zone may also be provided with additional air inlet passages, 136, throughout its length controlled by independent valves, 138, and connected with an air supply pipe, 137, which may receive its air from the same source as the air pipe, 130, or from a different source, as preferred. The preheating zone is also provided with eduction passages, 139, arranged at intervals throughout its length and being located, for example, on the opposite side from the heat distributing passages, and connected with a header or collecting flue, 140, leading by a pipe, 141, to a heater, 142, in a drier, 143, and thence to a stack, 144, or these heated products may be conducted to any other point, or to any other apparatus in which their residual heat may be utilized.

The air for the gas burners and for the injector nozzles, 128, may be provided by any suitable air forcing means as a fan or blower, 132, which in this instance is connected with the pipes, 115, supplying the burners, and a pipe, 130, supplying the nozzles. This air may be heated in any desired manner, and for this purpose I find it convenient to draw the air from the cooling zone, $A^5$, in which the hot fired products are parting with their heat, in order to utilize as far as possible, the heat from such fired products. For example, I have shown the cooling zone, $A^5$, provided with a plurality of separated inlets indicated at 150, preferably located adjacent to the discharge end of the kiln, and with eduction pipes, 151, preferably located at the other end of the cooling zone near the firing zone, where the air would be subjected to the fired goods at their highest temperature just before it passes out, and these eduction passages, 151, may be connected as by a header, 152, and pipe, 153, with the fan or blower, 132, so that the air delivered to the burners and to the nozzles, 128, will be highly heated, and a portion of the heat of the fired products will be utilized both in the firing zone and in the preheating zone.

The operation of my improved kiln of the single tunnel form just described, will be substantially the same as previously set forth, and a further detailed description of its operation will be unnecessary.

In Figs. 7, 8, 9, and 10, I have shown my invention embodied in a single tunnel kiln, in which the firing zone is provided with a single row of furnaces or burners located along one side only, the other features of the invention being exactly as previously described with reference to Figs. 4, 5, and 6. In these figures, the parts corresponding with those shown in Figs. 1 to 3 inclusive, are given the same reference numerals with the addition of 200. In this case, the firing zone indicated at $A^6$, as shown in section in Fig. 8, comprises the side walls, 201, and the crown, 203, and is provided interiorly with a single bridge wall, 206, connected with the adjacent side wall by the transverse partitions, 218.

208 represents the furnaces provided with burners, 211, supplied with gas from the gas supply pipe, 212, by pipes, 213, having the independent control valves, 214, and with air from the air supply pipe, 215, by pipes, 216, having independent control valves, 217. The firing chamber is also provided with a plurality of eduction ports, 219, connected by passages, 220 and 221, with the collecting flue, 222, in the manner previously described, said passages being controlled by independent means as the dampers, 223.

The preheating zone of this single tunnel kiln indicated at $A^8$, and shown in detail in Fig. 10, is provided with the heat distributing pipes or passages, 226 and 227, provided with injector nozzles, 228, controlled by valves, 231, and connected with the air supply pipe, 230, the heat distributing passages being provided with separate controlling means as the dampers, 235, and being connected with a continuation of the collecting flue, 222. The preheating chamber is also provided with a plurality of auxiliary air inlet passages, 236, connected with an air supply pipe, 237, and having individual controlling means as valves or dampers, 238. The preheating zone is also provided with eduction passages, 239, connected with the eduction flue, 240, and connected by a pipe, 241, with a heater, 242, in a drier, for example, 243, from which heater they pass to a stack, 244, all these parts being combined and operated in the manner hereinbefore described.

The cooling zone herein indicated at $A^7$, and shown in cross section in Fig. 9, is shown as provided with a plurality of air inlets, 250, for admitting fresh air to the cooling section for the purpose of heating it, and cooling the ware, which heated air is withdrawn from the cooling zone through eduction passages, 251, into a header, 252, and thence by a pipe, 253, into a fan or blower, 232, connected with the air pipe, 215, supplying the burners, and the air pipe, 230, supplying the injector nozzles, 228, and it may also be connected with the auxiliary air pipe, 237. It will be understood, that, the necessary air for these various air pipes may be set in motion by air forcing devices of any desired type, and that separate air forcing devices may be employed for supplying each of the air pipes, if necessary or desirable. I find it advantageous and economic, however, to use a single air forcing device for the kiln, as diagrammatically indicated in the drawing. It will be understood, that a single line of goods conveying means extends through the kiln from one end to the other, preferably a line of tunnel cars on track rails extending throughout the length of the kiln. The unfired ware enters at the outer end of the preheating zone, $A^8$, and will pass slowly therethrough and be gradually heated, water-smoked and oxidized as hereinbefore set forth, and being raised to substantially the temperature of the entering end of the firing zone, $A^6$, in passing through the preheating zone. It will also be understood, that, the injector nozzles, 228, will create a sufficient suction in the collecting flue, 222, and eduction passages connected therewith, to withdraw the products of combustion from the firing zone and discharge them together with fresh air for oxidizing purposes into the preheating zone at different points lengthwise thereof, the heat distributing passages and injector nozzles being independently controllable, so as to regulate both the heat and the quantity of fresh air admitted at various points throughout the length of the preheating zone to effect the desired results, and the air admitted may also be heated from the fired products in the cooling zone $A^7$, so as to assist in cooling the fired ware and utilize a portion of the heat thereof for preheating purposes. This is especially desirable in single tunnel kilns, in which the heat from the fired ware cannot be directly imparted to the unfired ware in the preheating chamber, as it can be in the twin tunnel kiln illustrated in Figs. 1 to 3 inclusive, in which it is not necessary to heat the air, although it may be so heated even in a twin tunnel kiln in any usual or desired manner, as by a recuperator through which the waste gases, etc., are passed, if found to be desirable. The preheated ware will be fired in the firing zone, $A^6$, and cooled in passing through the cooling zone, $A^7$, in the manner hereinbefore described with reference to Figs. 4 to 6 inclusive.

In carrying out my invention, it will be noted that a very accurate control of the firing zone is secured throughout its length in all forms of the invention for the purpose of maintaining the desired heat curve therein, and the products of combustion are withdrawn and utilized directly in combination with fresh air, to supply the necessary oxygen, in preheating, water-smoking, and oxidizing the unfired ware, thus effecting great economy of fuel, the heat from which is first expended in the firing zone by direct application to the ware, and then further used directly in contact with the unfired ware in the preheating zone, from which the products of combustion, together with vapors and gases produced in the preheating, water-smoking, and oxidation of the unfired ware, are continuously removed and conducted to a point where their residual heat may be further utilized, while their removal from the preheating zone facilitates the preheating, oxidizing, and water-smoking of the unfired ware.

It will also be seen, that, the preheating zone is under accurate control throughout its length as to both temperature and the amount of fresh air and oxygen supplied, so that the ware can be gradually raised in temperature and sufficient oxygen can be supplied at different points throughout the length of the preheating zone, to accomplish the oxidation and removal of objectionable ingredients in the clay in the most efficient manner.

It will also be noted, that, the construction of the kiln is extremely simple and comparatively inexpensive, which results in a minimum initial cost of construction and minimum expense of upkeep and repair.

What I claim and desire to obtain by Letters Patent is:—

1. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for withdrawing the products of combustion from the firing zone without permitting appreciable longitudinal flow thereof and means for conducting them outside of the kiln into the preheating zone for preheating, water-smoking, and oxidizing the unfired products therein.

2. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, and means for introducing air into the preheating zone to supply additional quantities of oxygen to assist in the oxidizing of the unfired products.

3. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, and means for introducing fresh air into the preheating zone to furnish additional oxygen for oxidizing the unfired products, and means for heating the said air previous to its introduction into the preheating zone.

4. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for withdrawing the products of combustion from the firing zone without permitting appreciable longitudinal flow thereof and means for conducting them outside of the kiln into the preheating zone at separated points longitudinally thereof, and means for independently regulating the admission of said products of combustion into the preheating zone at said separated points.

5. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone at separated points longitudinally thereof, and means for independently regulating the admission of said products of combustion into the preheating zone at said separated points, means for admitting fresh air into the preheating zone at separated points longitudinally thereof, and independent regulating means for independently regulating the admission of air at said separated points.

6. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for withdrawing the products of combustion from the firing zone without permitting appreciable longitudinal flow thereof and delivering them into the preheating zone for preheating, water-smoking, and oxidizing the unfired products therein, means for admitting air into the cooling zone for heating said air and assisting in cooling the fired products, and means for withdrawing the heated air from the cooling zone and admitting it into the preheating zone, to assist in the preheating, water-smoking, and oxidizing of the unfired products therein.

7. A tunnel kiln comprisng among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for withdrawing the products of combustion from the firing zone without permitting appreciable longitudinal flow thereof and delivering them into the preheating zone for preheating, water-smoking, and oxidizing the unfired products therein, means for admitting air into the cooling zone for heating said air and assisting in cooling the fired products, and means for withdrawing the heated air from the cooling zone and admitting it into the preheating zone at separated points longitudinally thereof.

8. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone at separated points longitudinally thereof, independent regulating means for independently regulating the admission of the products of combustion at said separated points, means for admitting air to the cooling zone for heating it and assisting in cooling the fired products, means for withdrawing said heated air from the cooling zone and delivering it into the preheating zone at separated points longitudinally thereof, and independent regulating means for independently regulating the admission of such heated air at said separated points.

9. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for conducting the products of combustion from the firing zone to the preheating zone, and air injecting means discharging fresh air into the preheating zone together with the products of combustion, said injecting means being constructed to effect the necessary suction for withdrawing the products of combustion from the firing zone and delivering them into the preheating zone.

10. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, said kiln being provided with passages for withdrawing the products of combustion from the firing zone and delivering them into the preheating zone, including a series of heat distributing passages discharging into the preheating zone at different points longitudinally thereof, air injecting nozzles adapted to discharge air into said heat distributing passages, and means for supplying air under pressure to said nozzles to deliver air into the preheating zone, and for effecting the necessary suction for withdrawing the products of combustion from the firing zone and delivering them with said air into the preheating zone.

11. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, said kiln being provided with passages for withdrawing the products of combustion from the firing zone and delivering them into the preheating zone, including a series of heat distributing passages discharging into the preheating zone at different points longitudinally thereof, air injecting nozzles adapted to discharge air into said heat distributing passages, means for supplying air under pressure to said nozzles to deliver air into the preheating zone, and for effecting the necessary suction for withdrawing the products of combustion from the firing zone and delivering them with said air into the preheating zone, and independent regulating devices for said nozzles.

12. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, said kiln being provided with passages for withdrawing the products of combustion from the firing zone and delivering them into the preheating zone, including a series of heat distributing passages discharging into the preheating zone at different points longitudinally thereof, air injecting nozzles adapted to discharge air into said heat distributing passages, and means for supplying air under pressure to said nozzles to deliver air into the preheating zone, and for effecting the necessary suction for withdrawing the products of combustion from the firing zone and delivering them with said air into the preheating zone, independent regulating devices for said heat distributing passages, and independent regulating means for said air injecting nozzles.

13. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, conducting means for conducting the products of combustion from the firing zone and delivering them into the preheating zone, including a plurality of heat distributing passages discharging into the preheating zone at different points longitudinally thereof, a plurality of air injecting nozzles each discharging into one of said heat distributing passages, means for admitting air to the cooling zone to heat said air and assist in cooling the fired ware, and means for withdrawing the heated air from the cooling zone and delivering it under pressure to said nozzles.

14. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, conducting means for conducting the products of combustion from the firing zone and delivering them into the preheating zone, including a plurality of heat distributing passages discharging into the preheating zone at different points longitudinally thereof, a plurality of air injecting nozzles each discharging into one of said heat distributing passages, means for admitting air to the cooling zone to heat said air and assist in cooling the fired ware, and means for withdrawing the heated air from the cooling zone and delivering it under pressure to said nozzles, and independent regulating means for each of said nozzles.

15. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, conducting means for conducting the products of combustion from the firing zone and delivering them into the preheating zone, including a plurality of heat distributing passages discharging into the preheating zone at different points longitudinally thereof, a plurality of air injecting nozzles each discharging into one of siad heat distributing passages, means for admitting air to the cooling zone to heat said air and assist in cooling the fired ware, and means for withdrawing the heated air from the cooling zone and delivering it under pressure to said nozzles, and independent regulating means for each of said heat distributing passages, and an independent regulating means for each of said nozzles.

16. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, and means for withdrawing the products of combustion from the preheating zone, together with gases and vapors produced therein.

17. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, means for withdrawing the products of combustion together with gases and vapors, at separated points longitudinally of the preheating zone, and independent regulating means, for independently regulating the withdrawal of said products of combustion, gases, and vapors at said separated points.

18. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, means for introducing fresh air into the preheating zone to furnish additional quantities of oxygen, and means for continuously withdrawing the products of combustion and air, together with gases and vapors formed in the preheating zone.

19. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for conducting the products of combustion from the firing zone to the preheating zone, including a plurality of heat distributing passages discharging into the preheating zone at different points longitudinally thereof, independent regulating means for said heat distributing passages, means for delivering fresh air into the preheating zone at different points longitudinally thereof, independent regulating means for independently regulating the admission of air at said different points, and means for continuously withdrawing from the preheating zone the products of combustion and air, together with gases and vapors at different points longitudinally of the preheating zone.

20. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for conducting the products of combustion from the firing zone to the preheating zone, including a plurality of heat distributing passages discharging into the preheating zone at different points longitudinally thereof, a plurality of injector nozzles each discharging into one of said heat distributing passages, means for delivering air under pressure to said nozzles, independent regulating means for said nozzles, and eduction passages for withdrawing the products of combustion and air, together with gases and vapors, from the preheating zone, located at different points longitudinally thereof.

21. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, and means for withdrawing the products of combustion from the firing zone and delivering them into the preheating zone for preheating, water-smoking, and oxidizing the unfired products therein, means for admitting air to the cooling zone, to heat said air and assist in cooling the fired products, means for withdrawing said heated air from the cooling zone and discharging it into the preheating zone, to assist in preheating, water-smoking, and oxidizing the unfired products, and means for withdrawing the products of combustion and air, together with gases and vapors from the preheating zone.

22. A tunnel kiln comprising among its members a firing zone, provided with heating means discharging their products of combustion into the firing zone, a preheating zone extending longitudinally from one end of the firing zone, a cooling zone extending longitudinally from the other end of the firing zone, goods conveying means extending through all of said zones, means for conducting the products of combustion from the firing zone and delivering them into the preheating zone, including heat distributing passages, means for withdrawing heated air from the cooling zone and injecting it under pressure into said heat distributing passages, to supply additional heat and oxygen to the preheating zone and effect the withdrawal of the products of combustion from the firing zone, and means for withdrawing the products of combustion and air, together with gases and vapors from the preheating zone.

23. A tunnel kiln comprising among its members a firing zone, a plurality of furnaces arranged longitudinally thereof, and provided with independent heat regulating means for maintaining a predetermined heat curve within the firing zone, said firing zone being provided with eduction passages adjacent to said furnaces for withdrawing the products of combustion from the firing zone, a preheating zone extending longitudinally from one end of the firing zone, a cooling zone extending longitudinally from the other end of the firing zone, goods conveying means extending through all of said zones, a heat collecting flue connected with the said eduction passages, heat distributing passages connected with said flue and discharging into the preheating zone at different points longitudinally thereof, and means for positively withdrawing the products of combustion from the firing zone and delivering them into the preheating zone.

24. A tunnel kiln comprising among its members a firing zone, a plurality of furnaces arranged longitudinally thereof, and provided with independent heat regulating means for maintaining a predetermined heat curve within the firing zone, said firing zone being provided with eduction passages adjacent to said furnaces for withdrawing the products of combustion from the firing zone, a preheating zone extending longitundinally from one end of the firing zone, a cooling zone extending longitudinally from the other end of the firing zone, goods conveying means extending through all of said zones, a heat collecting flue connected with the said eduction passages, heat distributing passages connected with said flue and discharging into the preheating zone at different points longitudinally thereof, an injector nozzle discharging into each of said heat distributing passages, and means for delivering air under pressure to said nozzles to furnish additional oxygen to the preheating zone, and to effect the positive withdrawal of said products of combusition from the firing zone and their delivery to the preheating zone.

25. A tunnel kiln comprising among its members a firing zone, a plurality of furnaces arranged longitudinally thereof, and provided with independent heat regulating means for maintaining a predetermined heat curve within the firing zone, said firing zone being provided with eduction passages adjacent to said furnaces for withdrawing the products of combustion from the firing zone, a preheating zone extending longitudinally from one end of the firing zone, a cooling zone extending longitudinally from the other end of the firing zone, goods conveying means extending through all of said zones, a heat collecting flue connected with the said eduction passages, heat distributing passages connected with said flue and discharging into the preheating zone at different points longitudinally thereof, and injector nozzle discharging into each of said heat distributing passages, means for withdrawing air from the cooling zone and delivering it under pressure to said nozzles, for supplying heat and oxygen to the preheating zone and effecting the positive withdrawal of the products of combustion from the firing zone, and their delivery to the preheating zone.

26. A tunnel kiln comprising among its members a firing zone, a plurality of furnaces arranged longitudinally thereof, and provided with independent heat regulating means for maintaining a predetermined heat curve within the firing zone, said firing zone being provided with eduction passages adjacent to said furnaces for withdrawing the products of combustion from the firing zone, a preheating zone extending longitudinally from one end of the firing zone, a cooling zone extending longitudinally from the other end of the firing zone, goods conveying means extending through all of said zones, a heat collecting flue connected with the said eduction passages, heat distributing passages connected with said flue and discharging into the preheating zone at different points longitudinally thereof, means for delivering fresh air to the preheating zone, and eduction passages for the preheating zone located at separated points longitudinally thereof, for withdrawing the products of combustion and air, together with gases and vapors from the preheating zone.

In testimony whereof I affix my signature.

WILLIAM LEE HANLEY, Jr.